(12) United States Patent
Hiraiwa (10) Patent No.: US 9,341,240 B2
(45) Date of Patent: May 17, 2016

(54) SHIFT DEVICE WITH SYNCHRONIZER

(71) Applicant: Kyowa Metal Works Co., Ltd., Kanagawa-ken (JP)

(72) Inventor: Kazuyoshi Hiraiwa, Kanagawa-ken (JP)

(73) Assignee: KYOWA METAL WORKS CO., LTD., Kanagawa-Ken (JP)

( * ) Notice: Subject to any disclaimer, the term of this patent is extended or adjusted under 35 U.S.C. 154(b) by 512 days.

(21) Appl. No.: 13/763,925

(22) Filed: Feb. 11, 2013

(65) Prior Publication Data

US 2013/0205929 A1    Aug. 15, 2013

(30) Foreign Application Priority Data

Feb. 13, 2012    (JP) .................................. 2012-028365

(51) Int. Cl.
*F16H 3/083*    (2006.01)
*F16D 23/06*    (2006.01)

(52) U.S. Cl.
CPC ................ *F16H 3/083* (2013.01); *F16D 23/06* (2013.01); *F16D 2023/065* (2013.01); *Y10T 74/19284* (2015.01)

(58) Field of Classification Search
CPC .... F16H 3/083; F16D 2023/065; F16D 23/06
See application file for complete search history.

(56) References Cited

U.S. PATENT DOCUMENTS

| 5,097,930 | A | * | 3/1992 | Reynolds et al. | ......... | 192/53.331 |
| 5,425,437 | A | * | 6/1995 | Nellums | ....................... | 192/53.3 |
| 5,695,033 | A | * | 12/1997 | Hiraiwa | ..................... | 192/53.32 |

FOREIGN PATENT DOCUMENTS

| DE | 10 2010 015 471 | 10/2011 |
| EP | 0 754 874 | 1/1997 |
| JP | 09-089002 | 3/1997 |
| JP | 2004-44648 | 2/2004 |

* cited by examiner

*Primary Examiner* — Terence Boes
(74) *Attorney, Agent, or Firm* — Wenderoth, Lind & Ponack, L.L.P.

(57) ABSTRACT

A shift device has lever members. These top portions engage with cut-off portions of a hub, being inserted in a groove portion of a shift sleeve. Slanted surfaces of the sleeve contact with the top portions to be capable of transmitting axial pressing force on the pressure-receiving surfaces of the ring. Friction torque acts on the members through first projections of the ring. The members has first slide surfaces contactable with first guide surfaces of the hub at both end portions in a rotational direction of the top portions, and second slide surfaces contactable with second guide surfaces of the hub at both end portions of the members.

15 Claims, 7 Drawing Sheets

SHIFT DEVICE WITH SYNCHRONIZER

BACKGROUND OF THE INVENTION

1. Field of the Invention

The present invention relates to a shift device with a synchronizer for a transmission in which pressing force applied to a shift sleeve can be amplified into larger pressing force acting on a synchronizer ring while gears of the transmission are shifted, thereby reducing operating force necessary for a driver or an actuator.

2. Description of the Related Art

A shift device with a synchronizer for a transmission of this kind is disclosed in Japanese unexamined patent application publication No. 09-89002. This conventional shift device is used to shift gears between fifth-speed and reverse speed. It has a hub, a shift sleeve, a synchronizer ring capable of being pressed toward a fifth-speed gear, and a plurality of lever members provided between the synchronizer ring and the hub. The lever members change an axial pressing force from the shift sleeve toward the fifth-speed into an amplified axial pressing force that acts on the synchronizer ring when the sleeve is being moved toward the fifth-speed gear, and they transmit the axial pressing force from the sleeve toward the reverse gear (in an opposite direction to the fifth-speed gear) to the fifth-speed gear so that the synchronizer ring and the fifth-speed gear are synchronized. This enables the sleeve rotating due to inertia of a clutch disc to stop the rotation thereof, and then the sleeve is smoothly engaged with the reverse gear. Thus the shift device can be a simple device using the lever members at lower manufacturing costs to decrease gear engagement noise in an operation to shift to the reverse-speed position.

In the operation to shift to the reverse-speed position, the friction torque of the synchronizer ring presses the lever members to extend them outwardly in the radial direction to prevent the sleeve from further advancing before the synchronization between the fifth-speed gear and the sleeve is ended. When the synchronization is ended, the blocking force of the synchronizer ring due to the friction torque vanishes. Accordingly, the slanted surfaces formed on the inner surface of the sleeve press the lever members inwardly in the radial direction, so that the sleeve moves toward and engages with the reverse gear.

The conventional shift device with the synchronizer, however, encounters the following problems.

In the conventional shift device, the lever members are formed like a semicircular shape when they are seen from their front sides, because they are inserted in the hollows formed on the hub. In this case, when the hollows of the hub are small in their radial lengths, the radial lengths of arm portions of the lever members inevitably become shorter in a state where end portions of the arm portions can contact with projections of the ring. As a result, the axial thicknesses of the lever members are needed to be larger in order to ensure the stiffness thereof. The lever members with larger thickness are difficult to be punched out in a press process.

It is, therefore, an object of the present invention to provide a shift device with a synchronizer for a transmission which overcomes the foregoing drawbacks and in which necessary stiffness of lever members can be ensured and the lever members can be easily formed in a press process.

SUMMARY OF THE INVENTION

According to the present invention there is provided a shift device with a synchronizer which includes a shaft, a hub, a shift sleeve, a speed-change gear, a synchronizer ring, and a plurality of lever members. The hub has a boss portion, a flange portion, an annular portion, a plurality of cut-off portions, a first guide surfaces, and one of a plurality of second guide surfaces and guide pins. The boss portion is connected with the shaft, the flange portion extends from the boss portion outwardly in a radial direction, and the annular portion is provided on an outer end portion of the flange portion, having outer splines on an outer side of the annular portion. The cut-off portions are formed from the flange portion to the annular portion.

The shift sleeve has inner splines on an inner circumference side. The inner splines are provided with slanted surfaces, being engaged with the outer splines of the hub in such a way that the shift sleeve is supported on the hub to be movable in an axial direction.

The speed-change gear is supported on the shaft and it has splines engageable with the inner splines of the shift sleeve and a cone surface at a hub side of the speed-change gear.

The synchronizer ring has a friction surface, a plurality of first projections, and a plurality of pressure-receiving surfaces. The friction surface is provided on an inner side of the synchronizer ring to be capable of pressed on the cone surface of the speed-change gear. The first projections are capable of transmitting friction torque generated between the cone surface of the speed-change gear and the friction surface of the synchronizer ring. The pressure-receiving surfaces are capable of receiving axial pressing force generated due to an axial movement of the shift sleeve.

The lever members are arranged among the shift sleeve, the hub and the synchronizer ring. The lever members have a top portion and arm portions at both sides of the top portion. The top portions are provided at both sides with first slide surfaces, being respectively engaged with the cut-off portions of the hub and contactable with the slanted surfaces of the shift sleeve. The arm portions are provided with second slide surfaces and torque-receiving surfaces. The first slide surfaces are provided at both sides in a rotational direction of the top portions, being respectively contactable with the first guide surfaces of the hub. The second slide surfaces are respectively contactable with the one of the second guide surfaces and the guide pins.

The side surfaces of the top portions of the lever members are capable of transmitting the axial pressing force to the pressure-receiving surfaces of the synchronizer ring, functioning as a point of effort of leverage of the lever members.

The torque-receiving surfaces of the lever members are capable of receiving the friction torque from the first projections of the synchronizer ring, functioning as a point of load of the leverage.

The arm portions of the lever members are capable of contacting with the hub, a contact point of the arm portions and the hub functioning as a fulcrum of the leverage.

Preferably, the synchronizer ring has a plurality of a second projections projecting in the radial direction at positions corresponding to the cut-off portions of the hub. The first projections are provided with reverse-speed pressure-receiving surfaces, and the second projections are provided with forward-speed pressure-receiving surfaces. The shift sleeve has a circular groove portion on an inner side of the inner splines. The circular groove portion has forward-speed slanted surfaces corresponding to the forward-speed torque-receiving surfaces and reverse-speed slanted surfaces corresponding to the reverse-speed receiving surfaces. The top portions of the lever members are inserted in the groove portion of the shift sleeve, and pressing force is transmittable to one of the forward-speed pressure-receiving surfaces and the reverse-speed pressure-receiving surfaces.

Preferably, the torque-receiving surfaces are formed by slanted surfaces on end portions of the arm portions of the lever members.

Preferably, the number of the cut-off portions of the hub is two, the number of the first projections of the synchronizer ring is four, the number of the forward-speed pressure-receiving surfaces of the synchronizer ring is two, the number of reverse-speed pressure-receiving surfaces of the synchronizer ring is four, and the number of the lever members is two.

Preferably, the shift device further includes a spring always pressing the lever members outwardly in a radial direction.

Preferably, the lever members are formed with a hollow having a fulcrum edge.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and their descriptions are omitted for eliminating duplication.

Figure 1:
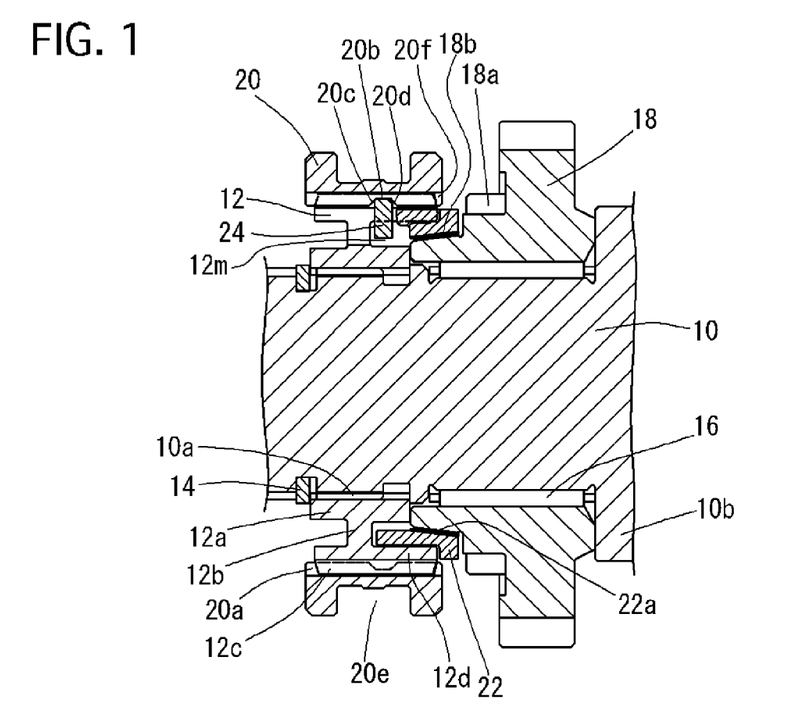
FIG. 1 is a cross-sectional side view showing a shift device with a synchronizer of a first embodiment according to the present invention, taken along a line A-A in FIG. 2.

Referring to FIG. 1, there is shown a shift device of a preferred first embodiment according to the present invention, which is adapted for a transmission of a motor vehicle. In the embodiment, the shift device is applied to obtain a fifth-speed and a reverse speed in the transmission.

The shift device includes an input shaft 10, a hub 12, a fifth-speed drive gear 18, a shift sleeve 20, a synchronizer ring 22 and three lever members 24.

The input shaft 10 is connected with a not-shown engine through a not-shown clutch disc. The input shaft 10 is formed with outer splines 10a and a flange portion 10b on its external surface. The outer splines 10a are engaged with inner splines of the hub 12, which is restrained from moving in an axial direction by a snap ring 14 and the fifth-speed gear 18 between the snap ring 14 and the flange portion 10b.

The fifth-speed drive gear 18 is located between the hub 12 and the flange portion 10b of the input shaft 10, being rotatably supported by using a bearing 16 on the input shaft 10. The fifth-speed drive gear 18 is always engaged with a not-shown fifth driven gear integrally formed with a not-shown output shaft, which is connected with not-shown drive wheels through not-shown axles. Spline teeth 18a are provided on an outer surface of a hub side portion of the fifth-speed drive gear 18. The gear 15 further has a cone-shaped surface portion for synchronization on the hub side portion of the gear 18, next to the spline teeth 18a. The fifth-speed drive gear 18 functions as a speed-change gear of the present invention.

Figure 2:
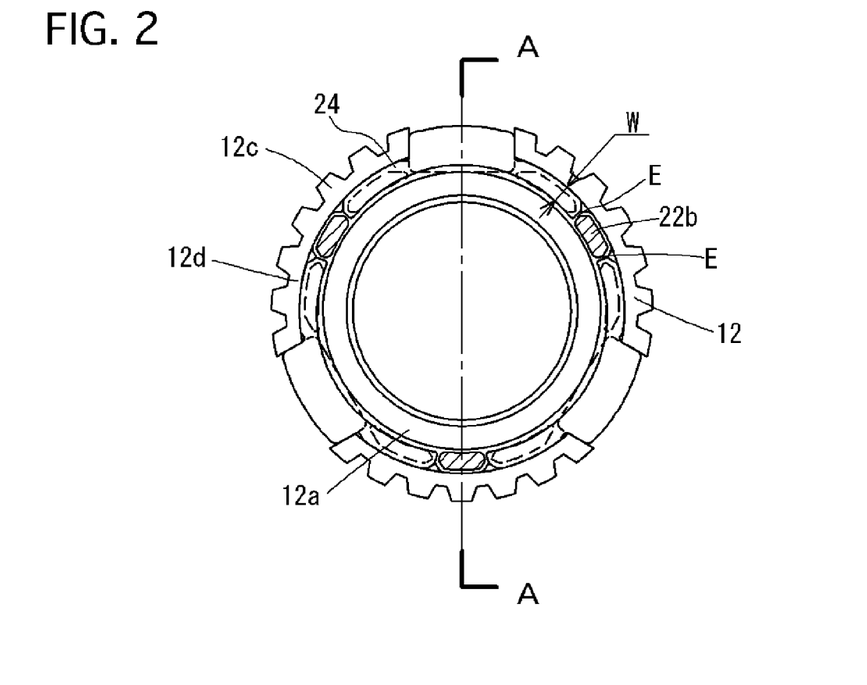
FIG. 2 is a partially cross-sectional front view showing lever members and a synchronizer ring which are set on a hub, where an input shaft and a fifth-speed gear are removed from the shift device of FIG. 1.
Figure 3:
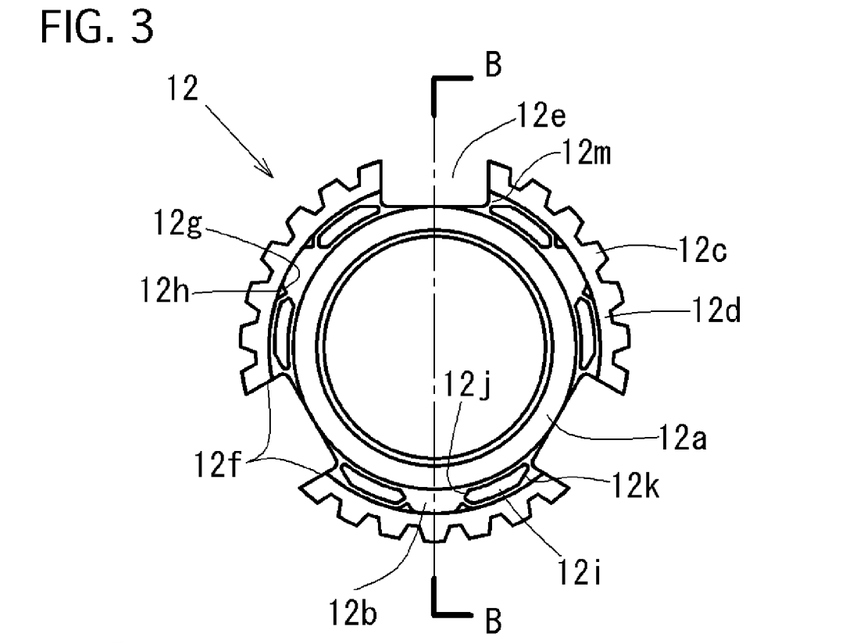
FIG. 3 is a front view showing the hub.
Figure 4:
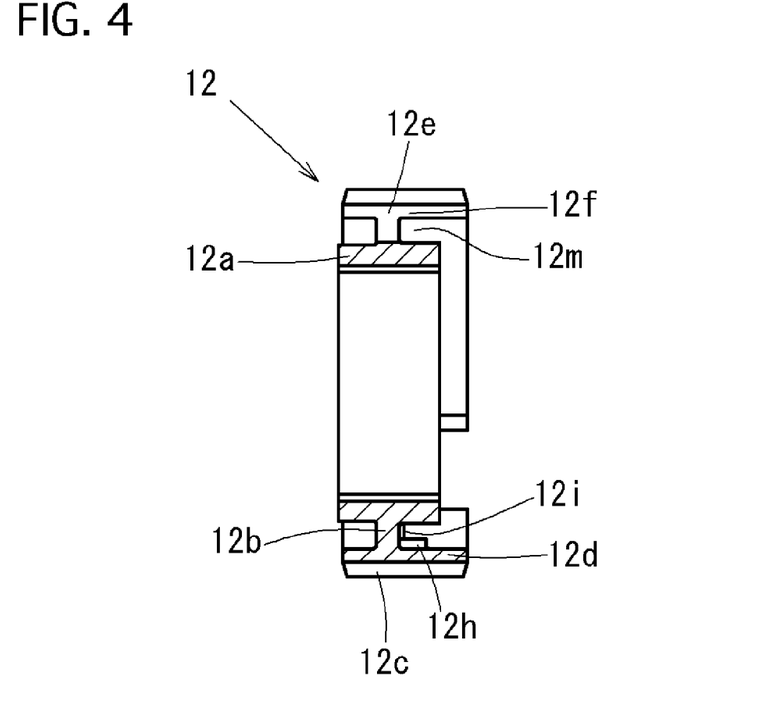
FIG. 4 is a cross-sectional side view of the hub, taken along a line B-B in FIG. 3.

As shown in FIGS. 2-4, the hub 12 has a boss portion 12a, a flange portion 12b extending from the boss portion 12a outwardly in the radial direction, and an annular portion 12d formed on an outer circumferential end portion of the flange portion 12d. Three cut-off portions 12e are provided from the annular portion 12 to the flange portion 12b, being equally spaced apart from each other in a circle. On the both sides of the cut-off portions 12e, first guide surfaces 12f are provided to guide the lever members 24. Two projecting portions 12h and two supporting surfaces 12i are provided between the adjacent cut-off portions 12e and on an inner side of the annular portion 12d. Accordingly the total number of the projecting portions 12h is six, and that of the supporting surfaces 12i is also six. The projecting portions 12h are formed with a second guide surface 12g to respectively guide the lever members 24, and the supporting surfaces 12i respectively contact with the lever members 24. The supporting surfaces 12i is provided with forward-speed edges 12j and reverse-speed edges 12k at the positions opposite to the forward-speed edges 12j. The forward-speed edges 12 and reverse-speed edges 12 function as fulcrums of the lever members 24 in the synchronization operations. Hollows 12m are formed from the flange portion 12b to the annular portions 12d.

The shift sleeve 20 is arranged on the outer side of the annular portion 12d of the hub 12 so that the inner splines 20a formed on the inner surface of the sleeve 20 are always engaged with the outer splines 12c of the hub 12 to be movable relative to each other in the axial direction. That is, the sleeve 20 moves toward the right side in FIG. 1, and its inner splines 20a are engaged with the spline 18a of the fifth-speed drive gear 18 when the shift operation to the fifth-speed position is ended.

The inner splines 20a are formed with a chamfer 20f at their fifth-speed gear sides. In addition, the inner splines 20a are formed with a circular groove portion 20b along the circumference thereof at an axial central portion of the inner splines 20a and on the inner side of the sleeve 20, further being formed with a forward-speed slanted surface 20c and a reverse-speed slanted surface 20d on the both end portions at a groove sides of the inner splines 20a. The forward-speed slanted surfaces 20c and the reverse-speed slanted surfaces 20d press the top portions 24a of the lever members 24 in the axial direction in the synchronization operations to the fifth-speed position and the reverse-speed position, respectively. The forward-speed slanted surfaces 20c and the reverse-speed slanted surfaces 20d function as the points of effort.

The sleeve 20 is further formed with a circular groove 20e on the outer circumference thereof to receive a not-shown shift fork that is operated by a hand of a driver or an actuator so that the shift sleeve 20 can be operated to move in a right and left direction in FIG. 1. FIG. 1 shows a state where the shift sleeve 20 is positioned at a neutral position. The shift sleeve 20 is moved toward the right side in FIG. 1 to establish the fifth-speed, while it is moved toward the left side to establish the reverse-speed.

Figure 5:
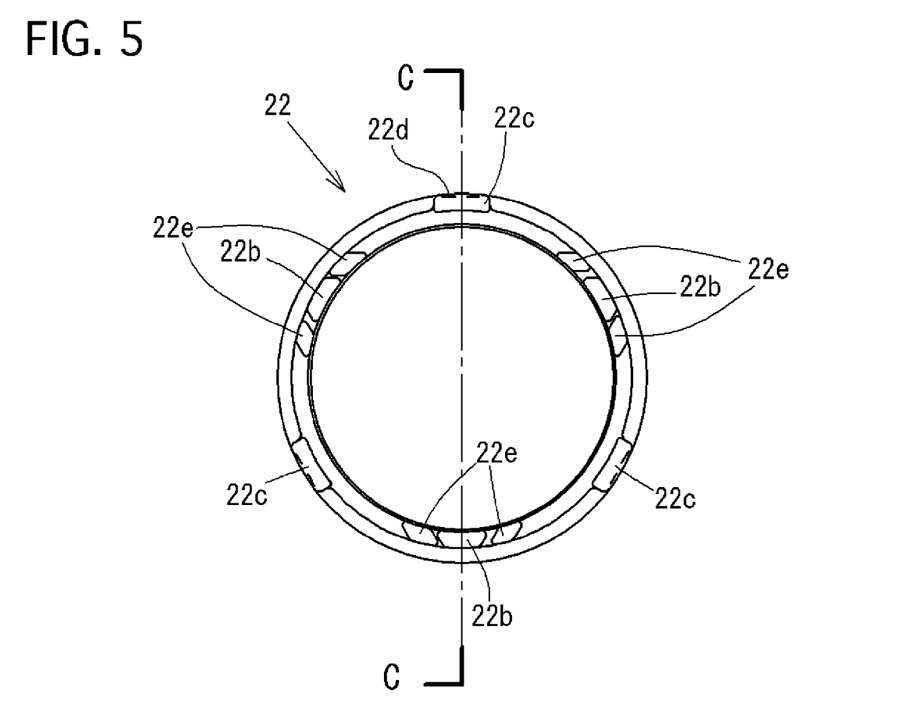
FIG. 5 is a front view showing the synchronizer ring.
Figure 6:
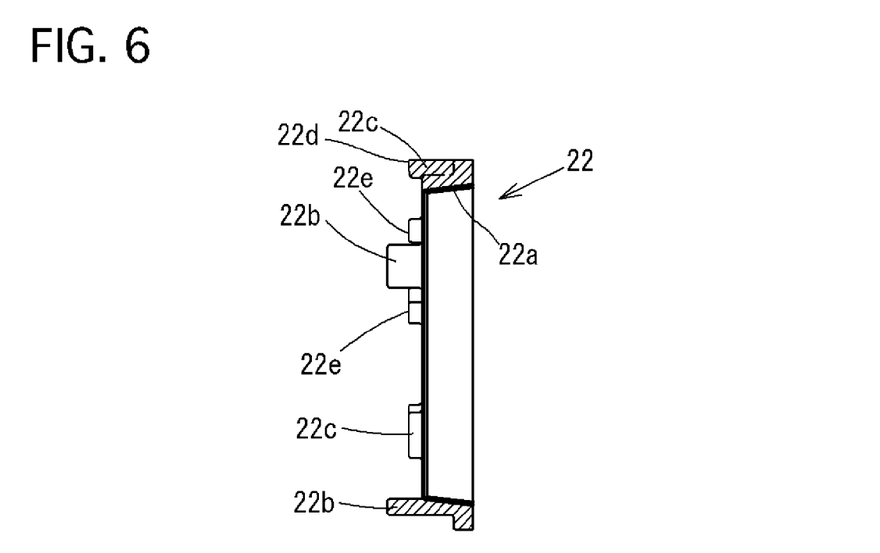
FIG. 6 is a cross-sectional side view of the synchronizer ring, taken along a line C-C in FIG. 5.

As shown in FIG. 1, the synchronizer ring 22 is arranged between the fifth-speed drive gear 18 and the hub 12. As shown in FIGS. 1, 5 and 6, the synchronizer ring 22 is formed on the inner side thereof with a cone-shaped friction surface 22a corresponding to the cone surface 18b of the fifth-speed drive gear 18 and also with three first projections 22b at the hub side thereof, being equally spaced in the circumference.

Three second projections 22c are formed on the external circumference of synchronizer ring 22 to project in the axial direction at the positions corresponding to the cut-off portions 12e of the hub 12, being equally spaced in the circumference. Forward-speed pressure-receiving surfaces 22d are formed at the hub side of the second projections 22c.

At the both sides in the circumferential direction of the first projections 22b, reverse-speed pressure-receiving surfaces 22e are provided. The forward-speed pressure-receiving surfaces 22d and the reverse-speed pressure-receiving surfaces 22e function as the points of load in the synchronization operations to the fifth-speed position and the reverse-speed position, respectively.

As shown in FIG. 1, the three lever members 24 are arranged between the synchronizer ring 22 and the hub 24, being equally spaced in the circumferential direction.

Figure 7:
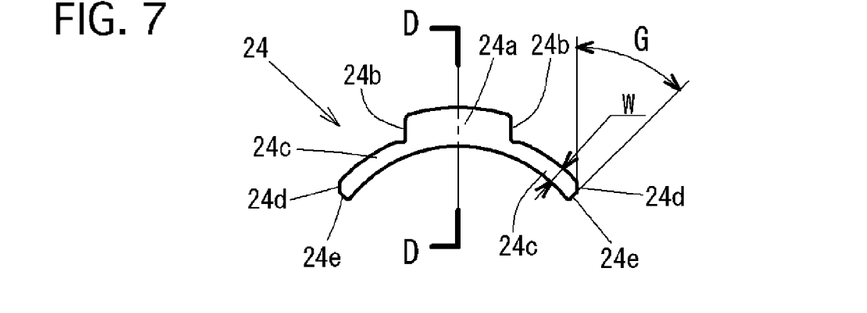
FIG. 7 is a front view showing one of the lever members.
Figure 8:
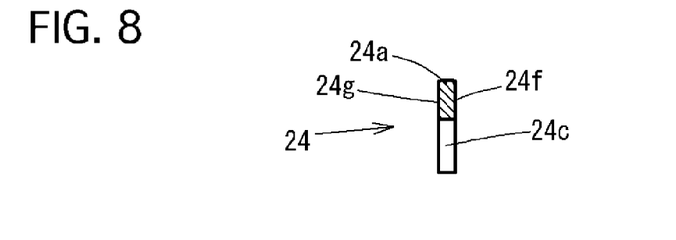
FIG. 8 is a cross-sectional side view of the lever member, taken along a line D-D in FIG. 7.

As shown in FIGS. 7 and 8, each of the lever members 24 is formed at the central portions thereof with a top portion 24a. First slide surfaces 24b are formed on the both side of the top portions 24a, corresponding to the first guide surfaces 12f of the hub 12. In addition, at the both sides of the top portions 24a, arc-shaped arm portions 24 with the length (width) W in the radial direction are provided to correspond to the hollows 12m of the hub 12.

At the both sides of the arm portions 24c, the second slide surfaces 24d and the torque-receiving surfaces 24e are formed opposite to each other. The second slide surfaces 24d correspond to the second guide surfaces 12g of the hub 12. The friction torque is transmitted from the first projections 22b of the ring 22 to the torque-receiving surfaces 24e of the lever members in the synchronization operations.

The top portions 24a of the three lever members 24 are engaged with the cut-off portions 12e of the hub 12, and the lever members 24 is capable of moving in the radial direction and swinging around the fulcrums. In this movement, the first slide surfaces 24b are guided along the first guide surfaces 12f of the hub 12, and the second slide surfaces 24d are guided along the second guide surfaces 12g of the hub 12.

The centrifugal force acts on the lever members 24 while the input shaft 10 rotates. Accordingly, the lever members 24 move outwardly in the radial direction as shown in FIGS. 1 and 2 so as to be pressed on the inner side of the annular portion 12d of the hub 12.

In a case where the lever members 24 are located at the positions shown in FIG. 1, the outer sides of the top portions 24a thereof are inserted in the groove portion 20b of the sleeve 20. The fifth-speed drive gear sides of the lever members 24 constitute pressing surfaces 24f, while the opposite sides thereof constitute fulcrum surfaces. The pressing surfaces 24f and the fulcrum surfaces 24g, together with the forward-speed edges 12j and the reverse-speed edges 12k of the hub 12, function as fulcrums in the synchronization operation.

The first projections 22b of the synchronizer ring 22 engage with the lever members 24 each with a clearance E in its rotational direction as shown in FIG. 2. Therefore, the synchronizer ring 22 is capable of slightly rotating relative to the hub 12 and the lever members 24 at the state shown in FIG. 2. When the synchronization operation is ended and the lever members 24 move inwardly in the radial direction, the clearance E shown in FIG. 2 becomes little so that the synchronizer ring 22 can hardly rotate relative to the hub 12 and the lever members 24.

The torque-receiving surfaces 24a of the lever members 24 are set to have an angle G relative to the second slide surfaces 24d as shown in FIG. 7.

Then, the operation of the shift device of the first embodiment will be described.

In the shift operation to the fifth-speed, the input shaft 10 is generally rotating.

In this operation, the shift fork moves the shift sleeve 30 toward the fifth-speed drive gear 18. The forward-speed slanted surface 20c of the sleeve 20 presses the top portions 24a of the lever members 24, which are inserted in the circular groove portion 20b of the shift sleeve 20, toward the right side in FIG. 1. As a result, the pressure-pressing surfaces 24f of the lever members 24 press the forward-speed pressure-receiving surface 22d of the ring 23 toward the right side in FIG. 1.

In other words, as the centrifugal force acts on the lever members 24 to spread them in the radial direction, the ring 22 is pressed from the forward-speed slanted surfaces 20 of the sleeve 20 in the axial direction by a load corresponding to the centrifugal force when the sleeve 20 is pressed. Accordingly, the friction surface 22a of the ring 22 is pressed on the cone surface 18b of the fifth-speed drive gear 18.

At this time, the friction is generated between the fiction surface 22a of the ring 22 and the cone surface 18b of the fifth-speed drive gear 18 when there is a rotational speed difference between them. This friction causes the ring 22 to rotate relative to the hub 12.

In other words, the synchronizer ring 22 is allowed to slightly rotate relative to the hub 12 and the lever members 24, and accordingly the ring 22 rotates till the first projections 22b of the ring 22 contact with the torque-receiving surfaces 24e of the lever members 24, where the friction torque acts on the torque-receiving surfaces 24e to press the lever members 24 outwardly in the radial direction.

Figure 9:
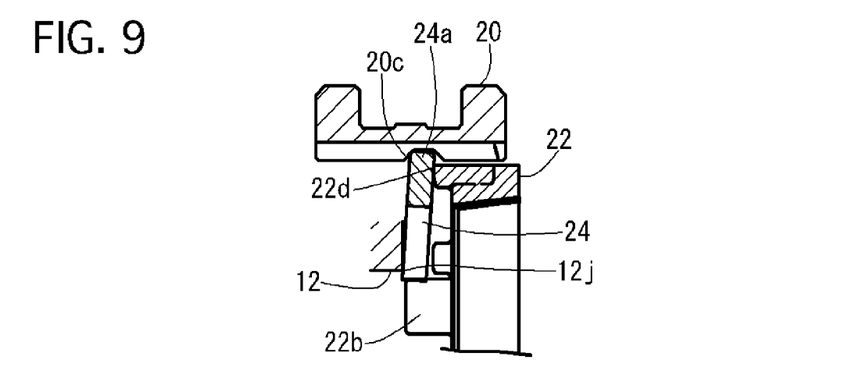
FIG. 9 is a view explaining an operation toward a fifth-speed position in the shift device of the first embodiment.

When the shift sleeve 20 presses the top portions 24a of the lever members 24, the leverage of the lever members 24 amplifies the pressing force that presses the synchronizer ring 22. FIG. 9 is an enlarged cross-sectional side view of a part of the shift device shown in FIG. 1 including a part of the hub 12, explaining the operation of the leverage thereof. The top portions 24a of the lever members 24 function as the points of effort, the forward-speed edges 12j of the hub 12 function as the fulcrums, and the forward-speed pressure-receiving surfaces 22d of the ring 22 function as the points of load.

The pressing force amplified due to the leverage of the lever members 24 push the synchronizer ring 22 against the cone surface 18b of the fifth-speed drive gear 18 to generate the friction torque therebetween. This starts the synchronization operation. Due to the friction torque in the synchronization operation, the first projections 22b of the ring 22 more strongly presses the torque-receiving surfaces 24e of the lever members 24 in the rotational direction. Thus the friction torque presses the lever members 24 outwardly in the radial direction.

The forward-speed slanted surfaces 20e of the shift sleeve 20 have the appropriately set their angles relative to a central axis of the input shaft 10, and the torque-receiving surfaces 24e of the lever members 24 are appropriately set to have an angle G, which is shown in FIG. 7, relative to the central axis of the input shaft 10. Therefore, the force, in which the lever members 24 are pressed outwardly in the radial direction due to the friction torque, is larger than that in which the lever members 24 are pressed inwardly in the radial direction through the forward-speed slanted surfaces 20c of the shift sleeve 20. Consequently the lever members 24 maintain the state shown in FIG. 9.

In other words, the shift sleeve 20 is blocked, that is, prevented from moving toward the fifth-speed drive gear 18, and it keeps pressing the synchronizer ring 22 against the cone surface 18b of the fifty speed drive gear 18 through the lever members 24.

Thus, the synchronization operation is accelerated while the synchronizer ring 22 is kept pressing against the cone surface 18b, and in due time the rotational speed difference between the input shaft 10 and the fifth-speed drive gear 18 disappears, so that the friction torque vanishes.

When the friction torque vanishes, the lever members 24 are pressed inwardly in the radial direction due to the force that is pressed from the forward-speed slanted surfaces 20c inwardly in the radial direction. At this time, the rotational position of the ring 22 is pressed back to the position shown in FIG. 2, and the synchronization operation ends.

In this operation, the first slide surfaces 24b and the second slide surfaces 24d of the lever members 24 can move smoothly inwardly in the radial direction along the first guide surfaces 12f and the second guide surfaces 12g of the hub 12, respectively.

The top portions 24a are disengaged from the circular groove portion 20b of the sleeve 20 when the lever members 24 move inwardly in the radial direction. Accordingly the shift sleeve 20 can move toward the fifth-speed drive gear 18, and then the inner splines 20a of the sleeve 20 engage with the splines 18a of the fifth-speed drive gear 18. This is the end of the shift operation.

Next the shift operation from the neutral position to the reverse-speed position will be described.

The shift operation to the reverse-speed position is generally carried out in a state where a motor vehicle stops. Nevertheless the input shaft 10, the hub 12, the clutch disc and others integrally connected with the input shaft 10 keep rotating due to their inertia immediately after a not-shown clutch is released. Accordingly gear engagement noise occurs when the shift sleeve 20 is engaged with a not-shown reverse gear in a state where the input shaft 10 keeps rotating.

The shift device of the first embodiment, however, suppresses the gear engagement noise as follows.

In the shift operation to the reverse-speed position, the shift fork moves the shift sleeve 20 in the direction opposite to the fifth-speed drive gear 18, namely toward the left side in FIG. 1. The shift sleeve 20 is moved toward the left side, in tandem to the operation to engage the shift sleeve 20 with the reverse gear. In this operation, the rotational speed of the fifth-speed drive gear 18 is 0.

On the other hand, the input shaft 10, the shift sleeve 20, the synchronizer ring 22 and the lever members 24 rotate in this operation. Accordingly the lever members 24 move outwardly in the radial direction due to the centrifugal force. In this state, when the shift sleeve 20 is moved toward the left side in FIG. 1, the reverse-speed slanted surfaces 20d of the sleeve 20 press the top portions 24a of the lever members 24 toward the left side in FIG. 1 and inwardly in the radial direction.

Figure 10:
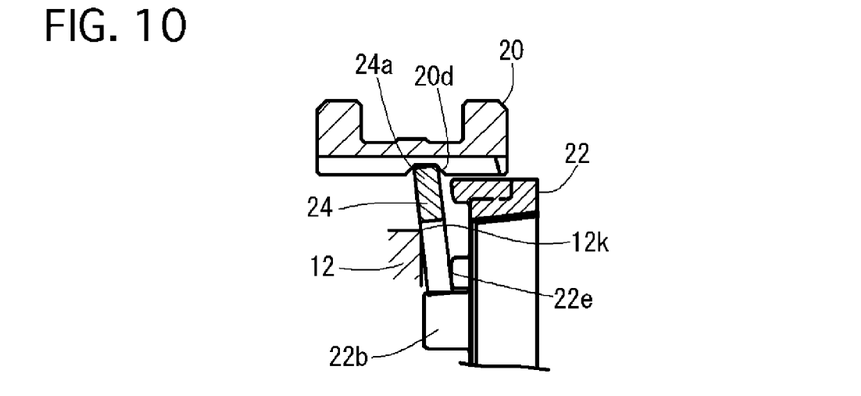
FIG. 10 is a view explaining an operation toward a reverse-speed position in the shift device of the first embodiment.

As shown in FIG. 10, the lever members 24 press the reverse-speed pressure-receiving surfaces 22e of the synchronizer ring 22 toward the fifth-speed drive gear 18 due to a reverse-speed function at the reverse-speed edges 12k of the hub 12 as the fulcrums. That is, the lever members 24 press the ring 22 due to the reverse-speed function in the direction opposite to the movement direction of the shift sleeve 20. FIG. 10 is an enlarged cross-sectional view of a part of the shift device, showing the synchronizing state. It also shows that the lever members 24 carry out the reverse-speed function at the reverse-speed edges 12k of the hub 12 as the fulcrums.

In this operation, the ring 22 is pressed by force component of the force in which the lever members 24 are spread due to the centrifugal force outwardly in the radial direction.

As described above, when the fifth-speed drive gear 15 stops and the input shaft 10 rotates, the friction generates between the friction surface 22a of the ring 22 pressed toward the fifth-speed drive gear 18 and the cone surface 18b of the fifth-speed drive gear 18. Consequently, the ring 22 rotates relative to the hub 12 and the lever members 24.

In this operation, the first projections 22b of the ring 22 contact with the torque-receiving surfaces 24e of the lever members 24. Thus the synchronization operation is executed and the shift sleeve 20 is prevented from further advancing.

In this case, the forward-speed slanted surfaces 20e of the sleeve 20 are appropriately set to have an angle relative to the central axis of the input shaft 10, and the torque-receiving surfaces 24e of the lever members 24 have the appropriately set angle G, which is shown in FIG. 7, relative to the central axis of the input shaft 10. Therefore, the force, in which the lever members 24 are pressed outwardly in the radial direction due to the friction torque between the friction surface 22a and the cone surface 18b, is larger than the force in which the lever members 24 are pressed inwardly in the radial direction through the reverse-speed slanted surfaces 20d of the sleeve 20. The sleeve 20 is prevented from moving toward the left side in FIG. 1, and the synchronization operation between the stopped fifth-speed drive gear 18 and the rotating ring 20 is accelerated.

In due time, the rotational speed difference between the input shaft 10 and the stopped fifth-speed drive gear 19 disappears. That is, the friction torque vanishes when the input shaft 10 stops.

When the friction torque vanishes, the lever members 24 are pressed inwardly in the radial direction due to the force acting inwardly in the radiation from the reverse-speed slanted surface 20d of the shift sleeve 20, the ring 22 is pressed back to the rotational position shown in FIG. 2, and the synchronization operation ends.

At this time, the first slide surfaces 24b and the second slide surfaces 24d of the lever members 24 can smoothly move along the first guide surfaces 12f and the second guide surfaces 12g of the hub 12.

The inwardly radial-directional movement of the lever members 24 causes the top portions 24a thereof to be disengaged from the groove portion 20b of the sleeve 20, which enables the sleeve 20 to move toward the left side in FIG. 2.

Consequently, a not-sown axial sliding gear is moved by the sleeve 20 to engage with not-shown reverse gears on the input shaft 10 and the output shaft, and this is the end of the shift operation.

In this engagement, the axial sliding gear and the reverse gears can be engaged without gear engagement noise because the not-shown clutch disc stops.

As described above, the shift device of the first embodiment has the following advantages.

The shift device of the first embodiment can provide the synchronization operation and the amplification function of the operating force by using the lever members 24, decreasing the gear engagement noise in the shift operation.

In addition, the lever members 24 can be compact because the arm portions 24c can be set shorter. Therefore, even in a case where the depth of the hollows 12m of the hub 12 is small and accordingly the radial length W of the arm portions 24c of the lever members 24 is set small, the stiffness of the lever members 24 can be ensured, because the arm portions 24a are small in length. This also enables the lever members 24 to be easily formed in a press process.

Next, a shift device of a second embodiment according to the present invention will be described.

The shift device of the second embodiment is shown in FIGS. 11-14, and the device is different from the first embodiment in the number of lever members 24 and configurations of a hub 12 and a synchronizer ring 22. The number of the lever members 24 is two. In addition, the shift device of the second embodiment is arranged on an output shaft 26, while it is arranged on the input shaft 10 in the first embodiment. The output shaft 26 rotatably supports a fifth-speed driven gear 18A, which is engaged with a not-shown fifth-speed drive gear connected with a not-shown input shaft. The fifth-speed driven gear 18A functions as the speed-change gear of the present invention.

In the second embodiment, when a motor vehicle stops, the output shaft 26, the hub 12, and a shift sleeve 20 stop, but a not-shown clutch disc, the input shaft and the fifth-speed drive gear rotates.

Therefore, in a shift operation to a reverse-speed position when the vehicle stops, no centrifugal force acts on the lever members 24. Accordingly, in the second embodiment, a spring 28 is provided to always act its elastic force acting outwardly in a radial direction instead of the centrifugal force in the first embodiment.

Figure 11:
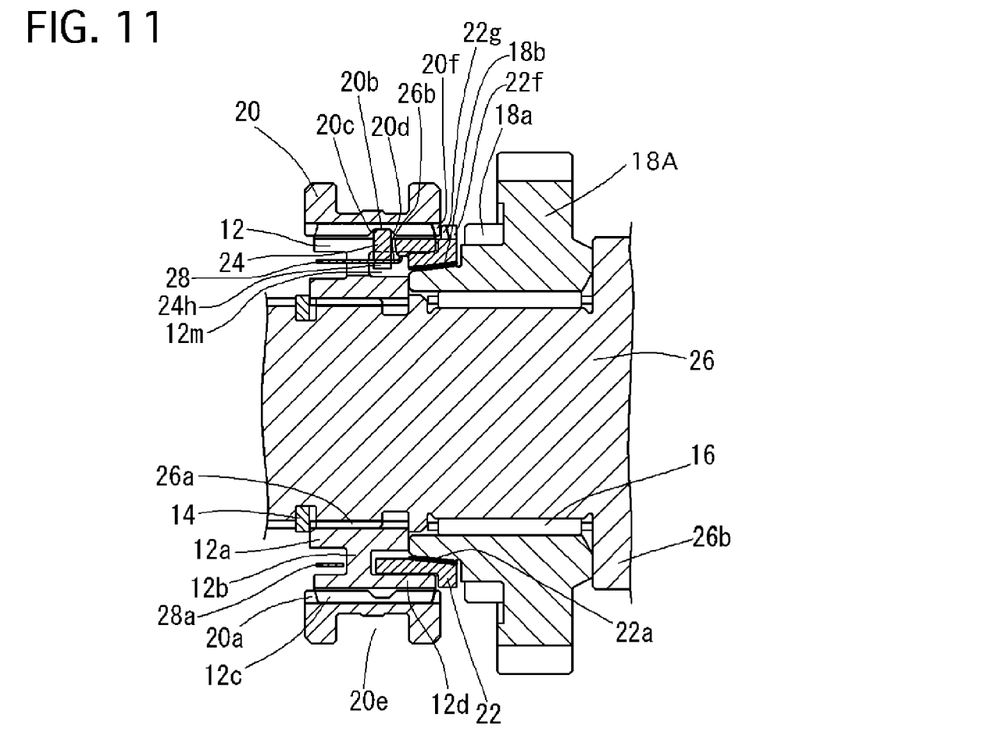
FIG. 11 is a cross-sectional side view showing a shift device with a synchronizer of a second embodiment according to the present invention.
Figure 13:
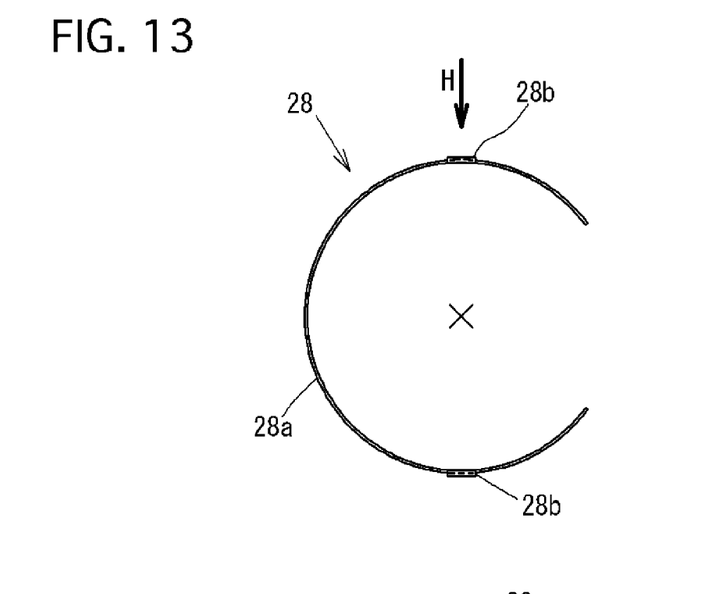
FIG. 13 is a front view showing a spring used in the second embodiment.
Figure 14:
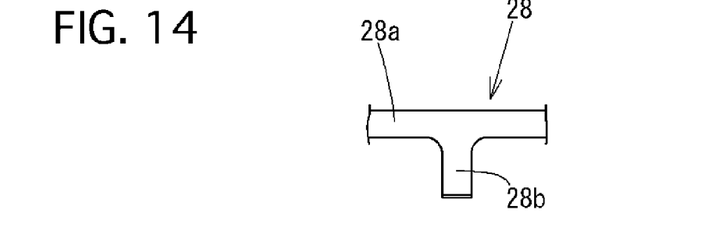
FIG. 14 is a plan view showing a part of an upper surface of the spring, seen along an arrow H in FIG. 13.

Specifically, the spring 28 has an arc main portion 28a shaped like a C-letter and two axial projections 28b projecting from the arm portion 28a in an axial direction toward hollows 24h of the lever members 24 as shown in FIGS. 11, 13 and 14. The axial projections 28b contact with and press the lever members 24 outwardly in the radial direction.

Figure 12:
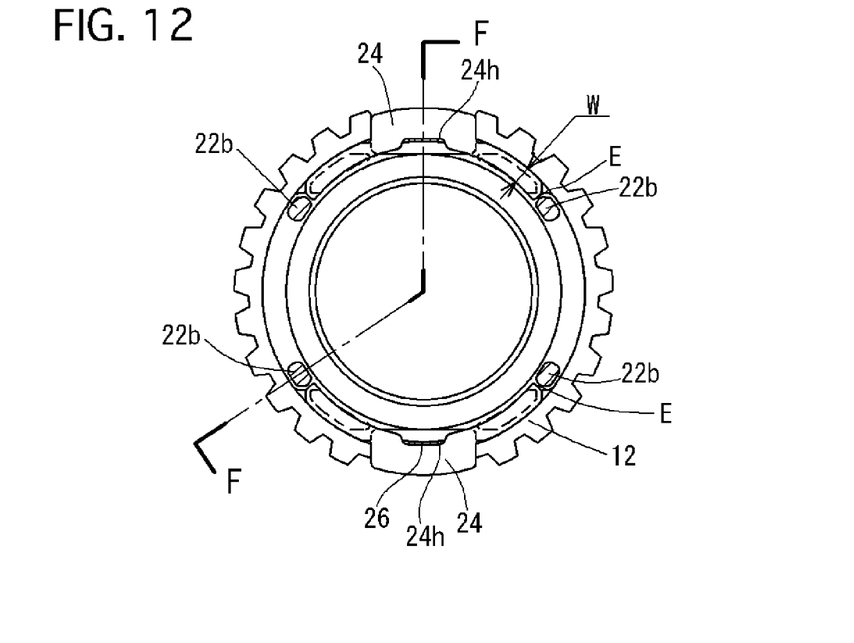
FIG. 12 is a partially cross-sectional front view showing lever members and a synchronizer ring which are set on a hub of the second embodiment.

As the number of the lever members 24 are two in the second embodiment, the number of first projections 22b of the synchronizer ring 22 is four, where the two of the four first projections 22b are arranged at the both sides of each lever member 24 as shown in FIG. 12.

Splines 22f are formed on an outer circumference of the synchronizer ring 22 similarly to those of a conventional Borg-Warner type synchronizer, and the splines 22f have chamfers 22g corresponding to chamfers 20f of the sleeve 20.

The hub 12 of the second embodiment has cut-off portions 12e, first guide surfaces 12f, second guide surfaces 12g, supporting surfaces 12i, forward-speed edges 12j, and reverse-speed edges 12k similarly to those of the hub of the first embodiment, although the number and the arrangement thereof are different from each other because the number of lever members 24 is two in the second embodiment but it is three in the first embodiment. The other construction is similar to that of the first embodiment.

The operation of the shift device of the second embodiment will be described.

In the shift operation to a fifth-speed position, the lever members 24 are spread outwardly in the radial direction due to the centrifugal force and the elastic force of the spring 28 because the output shaft 26 and the fifth-speed driven gear 18A generally rotate in this shift operation. Therefore, its operation is similar to that of the first embodiment, that is, the lever members 24 press the synchronizer ring 22 in the axial direction by amplified force. A synchronization function in the shift operation to the fifth-speed position is similar to that of Borg-Warner type synchronizer as a general one.

On the other hand, in the shift operation to a reverse-speed position, the operation is carried out in a state where the output shaft 26 and the synchronizer ring 22 stop and the fifth-speed driven gear 18A rotates. The lever members 24 are pushed outwardly in the radial direction due to only the elastic force of the spring 28. Except the elastic force the spring 28 instead of the centrifugal force, the operation of the second embodiment is similar to that of the first embodiment.

The shift device of the second embodiment has the advantages similar to those of the first embodiment.

Next, a shift device of a third embodiment according to the present invention will be described.

Figure 15:
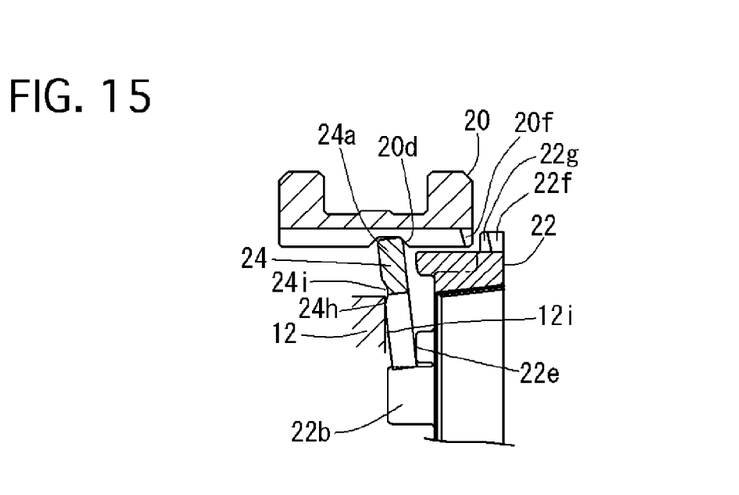
FIG. 15 is a cross-sectional side view showing a main part of a shift device with a synchronizer of a third embodiment according to the present invention.

The shift device of the third embodiment is different from the first embodiment in the positions of fulcrums of lever members 24.

Specifically, as shown in FIG. 15 that shows the shift operation to the reverse-speed operation, the lever members 24 are formed with a hollow having a fulcrum edge 24h. The contact portions of the fulcrum edges 24h and support surfaces 12i of a hub 12 function as fulcrums of the lever members 24 so that they can turn over the lever members 24 around the fulcrums in a shift operation to a reverse-speed position. The other construction is similar to that of the first embodiment.

The operation of the third embodiment is different from the first embodiment only in the constructions of the fulcrums of the lever members 24 that are different from those in the first embodiment. Therefore, the shift device of the third embodiment has the advantages similar to those of the first embodiment. In addition, the lever members 24 can smoothly move inwardly in the radial direction because of the positions of the fulcrums for reverse-speed when the synchronization operation is ended in the shift operation to the reverse-speed position.

Next, a shift device of a fourth embodiment according to the present invention will be described.

Figure 16:
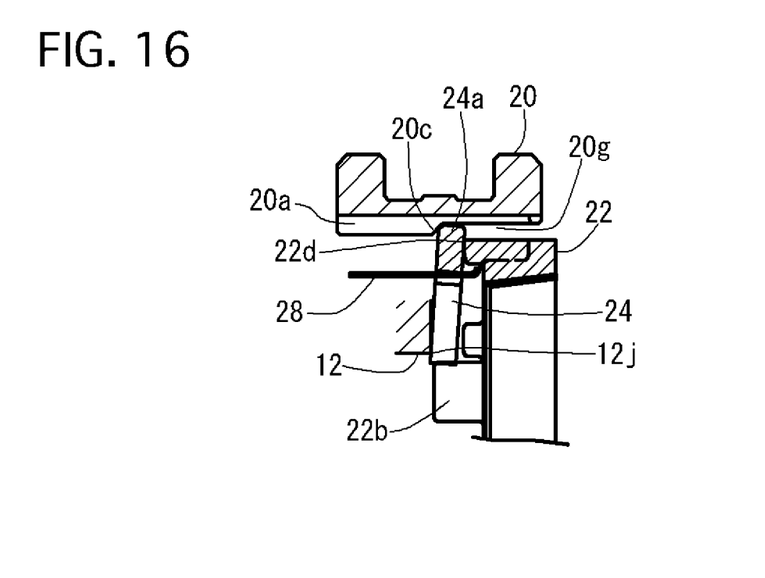
FIG. 16 is a cross-sectional side view showing a main part of a shift device with a synchronizer of a fourth embodiment according to the present invention.

The shift device of the fourth embodiment is different from the first embodiment in deformation of a shift sleeve 20 and addition of a spring 28 as shown in FIG. 16.

Inner splines 20a of the sleeve 20 are formed with cut-off portions 20g having only forward-speed slanted surfaces 20c. That is, the inner splines 20a do not have reverse-speed slanted surfaces 20d. Accordingly the device of the fourth embodiment is used to shift only to the fifth-speed position, not to a reverse-speed position.

The other construction is similar to that of the first embodiment.

The operation of the fourth embodiment is similar to the shift operation to the fifth-speed position in the first embodiment.

The shift device of the fourth embodiment has the advantages similar to those of the first embodiment except a reduction in gear engagement noise in the reverse-shift operation.

Next, a shift device of a fifth embodiment according to the present invention will be described.

Figure 17:
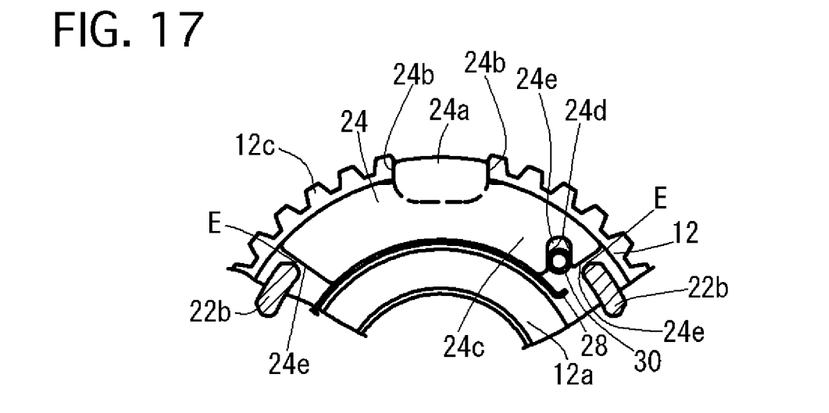
FIG. 17 is a partially cross-sectional front view showing a lever member and a synchronizer ring of a shift device with a synchronizer of a fifth embodiment according to the present invention.

The shift device of the fifth embodiment is suitable for a larger-sized transmission. It is different from the first embodiment in a hub 12 and lever members 24. Specifically, the hub 12 is integrally provided with guide pins 30 instead of the second guide surfaces 12g of the first embodiment, and hollows 24c formed on end portions of arm portions 24c of the lever members 24 are engaged with the guide pins 30, respectively, as shown in FIG. 17.

The hub 12 is formed with not-shown through-hollows into which the guide pins 30 are pressed. The guide pins 30 may be solid-core pins or roll pins made from elastic material.

The both side surfaces of the groove portion 24b function as second slide surfaces of the present invention. Accordingly, the second slide surfaces 24d are formed parallel to the first slide surfaces 24b, respectively.

A spring 28 is provided at the inner side in a radial direction of the lever members 24 so as to always press the lever members 24 outwardly in the radial direction. The spring 28 of the fifth embodiment is formed similarly to that of the second embodiment except that it has only an arm portion 28a thereof. The other construction is similar to that of the first embodiment.

The operation of the fifth embodiment is similar to that of the first embodiment except that the second slide surfaces 24d of the lever members 24 contact with the guide pins 30 of the hub 12 in the fifth embodiment while the second slide surfaces 24d contact with the second guide surfaces of the hub 12 in the first embodiment.

The shift device of the fifth embodiment has the advantages similar to those of the first embodiment.

While there have been particularly shown and described with reference to preferred embodiments thereof, it will be understood that various modifications may be made therein, and it is intended to cover in the appended claims and all such modifications as fall within the true spirit and scope of the invention.

The speed-change gear is not limited to the fifth-speed drive or driven gear, it may be other-speed gear.

The entire contents of Japanese Patent Application No. 2012-028365 filed Feb. 13, 2012 are incorporated herein by reference.

What is claimed is:

1. A shift device with a synchronizer comprising:
a shaft;
a hub having a boss portion, a flange portion, an annular portion, a plurality of cut-off portions, a plurality of first guide surfaces, one of a plurality of second guide surfaces and guide pins, the boss portion being connected with the shaft, the flange portion extending from the boss portion outwardly in a radial direction, the annular portion being provided on an outer end portion of the flange portion and having outer splines on an outer side of the annular portion, and the cut-off portions being formed from the flange portion to the annular portion;
a shift sleeve having inner splines on an inner circumference side, the inner splines being provided with slanted surfaces and engaged with the outer splines of the hub in such a way that the shift sleeve is supported on the hub to be movable in an axial direction;
a speed-change gear supported on the shaft and having splines engageable with the inner splines of the shift sleeve and a cone surface at a hub side of the speed-change gear;
a synchronizer ring having a friction surface, a plurality of first projections, and a plurality of pressure-receiving surfaces, the friction surface being provided on an inner side of the synchronizer ring to be capable of pressed on the cone surface of the speed-change gear, the first projections being capable of transmitting friction torque generated between the cone surface of the speed-change gear and the friction surface of the synchronizer ring, and the pressure-receiving surfaces being capable of receiving axial pressing force generated due to an axial movement of the shift sleeve; and
a plurality of lever members arranged among the shift sleeve, the hub and the synchronizer ring, the lever members having a top portion and arm portions at both sides of the top portion, the top portion being provided at both sides with first slide surfaces and being respectively engaged with the cut-off portions of the hub and contactable with the slanted surfaces of the shift sleeve, the arm portions being provided with second slide surfaces and torque-receiving surfaces, the first slide surfaces being provided at both sides in a rotational direction of the top portions and being respectively contactable with the first guide surfaces of the hub, and the second slide surfaces being respectively contactable with the one of the second guide surfaces and the guide pins; wherein
the side surfaces of the top portions of the lever members are capable of transmitting the axial pressing force to the pressure-receiving surfaces of the synchronizer ring, functioning as a point of effort of leverage of the lever members, wherein
the torque-receiving surfaces of the lever members are capable of receiving the friction torque from the first projections of the synchronizer ring, functioning as a point of load of the leverage, and wherein
the arm portions of the lever members are capable of contacting with the hub, a contact point of the arm portions and the hub, functioning as a fulcrum of the leverage.

2. The shift device according to claim 1, wherein
the synchronizer ring has a plurality of a second projections projecting in the radial direction at positions corresponding to the cut-off portions of the hub, the first projections being provided with reverse-speed pressure-receiving surfaces, and the second projections being provided with forward-speed pressure-receiving surfaces, wherein
the shift sleeve has a circular groove portion on an inner side of the inner splines, the circular groove portion having forward-speed slanted surfaces corresponding to the forward-speed torque-receiving surfaces and reverse-speed slanted surfaces corresponding to the reverse-speed receiving surfaces, and wherein
the top portions of the lever members are inserted in the groove portion of the shift sleeve and pressing force due to an axial movement of the shift sleeve is transmittable to one of the forward-speed pressure-receiving surfaces and the reverse-speed pressure-receiving surfaces.

3. The shift device according to claim 2, wherein
the torque-receiving surfaces are formed by slanted surfaces on end portions of the arm portions of the lever members.

4. The shift device according to claim 3, wherein
the number of the cut-off portions of the hub is two, the number of the first projections of the synchronizer ring is four, the number of the forward-speed pressure-receiving surfaces of the synchronizer ring is two, the number of reverse-speed pressure-receiving surfaces of the synchronizer ring is four, and the number of the lever members is two.

5. The shift device according to claim 4, further comprises:
a spring always pressing the lever members outwardly in a radial direction.

6. The shift device according to claim 5, wherein
the lever members are formed with a hollow having a fulcrum edge.

7. The shift device according to claim 2, wherein
the number of the cut-off portions of the hub is two, the number of the first projections of the synchronizer ring is four, the number of the forward-speed pressure-receiving surfaces of the synchronizer ring is two,
the number of reverse-speed pressure-receiving surfaces of the synchronizer ring is four, and the number of the lever members is two.

8. The shift device according to claim 7, further comprises:
a spring always pressing the lever members outwardly in a radial direction.

9. The shift device according to claim 8, wherein
the lever members are formed with a hollow having a fulcrum edge.

10. The shift device according to claim 2, further comprises:
a spring always pressing the lever members outwardly in a radial direction.

11. The shift device according to claim 10, wherein
the lever members are formed with a hollow having a fulcrum edge.

12. The shift device according to claim 2, wherein
the lever members are formed with a hollow having a fulcrum edge.

13. The shift device according to claim 1, further comprises:
a spring always pressing the lever members outwardly in a radial direction.

14. The shift device according to claim 13, wherein
the lever members are formed with a hollow having a fulcrum edge.

15. The shift device according to claim 1, wherein
the lever members are formed with a hollow having a fulcrum edge.

* * * * *